United States Patent
Kleinberger et al.

(10) Patent No.: US 12,123,620 B2
(45) Date of Patent: Oct. 22, 2024

(54) HUMIDIFICATION SYSTEMS

(71) Applicant: PRODEW, INC., Marietta, GA (US)

(72) Inventors: Itamar Kleinberger, Marietta, GA (US); Shakeel Merchant, Atlanta, GA (US); Roland J. Bilodeau, Canton, GA (US); Faizan Aly, Smyrna, GA (US); Kendall C. Palmer, Hiram, GA (US); Paul Wilhelm, Roswell, GA (US)

(73) Assignee: PRODEW, INC., Marietta, GA (US)

(*) Notice: Subject to any disclaimer, the term of this patent is extended or adjusted under 35 U.S.C. 154(b) by 0 days.

(21) Appl. No.: 17/968,522

(22) Filed: Oct. 18, 2022

(65) Prior Publication Data

US 2023/0029762 A1  Feb. 2, 2023

Related U.S. Application Data

(62) Division of application No. 16/158,945, filed on Oct. 12, 2018, now Pat. No. 11,493,215.

(Continued)

(51) Int. Cl.
*F24F 6/14* (2006.01)
*A47F 3/00* (2006.01)
(Continued)

(52) U.S. Cl.
CPC .............. *F24F 6/14* (2013.01); *A47F 3/001* (2013.01); *B05B 17/06* (2013.01);
(Continued)

(58) Field of Classification Search
CPC .... F24F 6/14; F24F 11/0008; F24F 2006/006; F24F 2006/146; A47F 3/001; B05B 17/06; Y02B 30/54
See application file for complete search history.

(56) References Cited

U.S. PATENT DOCUMENTS 1,982,137 A * 11/1934 Hanley ................. B05B 7/1281
                                                239/536
2,450,571 A * 10/1948 Bahnson, Jr. ............. F24F 3/14
                                                 261/78.2
(Continued)

FOREIGN PATENT DOCUMENTS

CN      2460224 Y    11/2001
CN      102200334    9/2011
(Continued)

OTHER PUBLICATIONS

"Ultrasonic nozzle" Wikipedia published May 8, 2016 accessed at <https://en.wikipedia.org/w/index.php?title=Ultrasonic_nozzle&oldid=719274023> (Year: 2016).*

(Continued)

*Primary Examiner* — Stephen Hobson
(74) *Attorney, Agent, or Firm* — Perilla Knox & Hildebrandt LLP

(57) ABSTRACT

A humidification system including a water-delivery system, an air-delivery system, a control system, and at least one fog-generation system. In example forms, the system includes a water-and-air delivery bar, a fog-delivery block, and/or a tubing-and-track delivery system. In another example form, a humidification system includes a housing having a nozzle discharge body, an air inlet coupling having an air delivery conduit extending therethrough, and a water inlet coupling having a water delivery conduit extending therethrough, and further including means for providing heating and/or a consistent back-pressure and flowrate across multiple nozzles in a multi-nozzle array.

19 Claims, 14 Drawing Sheets

Related U.S. Application Data

(60) Provisional application No. 62/571,549, filed on Oct. 12, 2017.

(51) Int. Cl.
  *B05B 17/06* (2006.01)
  *F24F 11/00* (2018.01)
  *F24F 6/00* (2006.01)

(52) U.S. Cl.
  CPC ..... *F24F 11/0008* (2013.01); *F24F 2006/006* (2013.01); *F24F 2006/143* (2013.01); *F24F 2006/146* (2013.01)

(56) References Cited

U.S. PATENT DOCUMENTS

| | | | | |
|---|---|---|---|---|
| 2,979,266 A * | 4/1961 | Bailey | B05B 7/066 | 236/44 R |
| 4,179,900 A * | 12/1979 | Corrigan | A47F 3/0443 | 62/247 |
| 4,572,428 A * | 2/1986 | Groff | F24F 11/62 | 236/44 A |
| 4,671,456 A * | 6/1987 | Groff | F24F 11/62 | 236/44 A |
| 4,678,125 A * | 7/1987 | Elston | B05B 7/0884 | 239/589.1 |
| 4,783,008 A * | 11/1988 | Ikeuchi | B05B 7/066 | 239/421 |
| 5,193,354 A * | 3/1993 | Kleinberger | F24F 6/14 | 261/78.2 |
| 5,337,960 A * | 8/1994 | Allen | F24F 6/14 | 239/280.5 |
| 5,463,873 A * | 11/1995 | Early | F02C 7/1435 | 236/44 A |
| 5,540,383 A * | 7/1996 | Ducey | F24F 5/0035 | 239/289 |
| 5,628,273 A * | 5/1997 | Crouse, II | B63B 17/00 | 239/289 |
| 6,027,030 A * | 2/2000 | Buijsse | B05B 7/2489 | 236/44 C |
| 6,029,911 A * | 2/2000 | Watanabe | B01F 25/31242 | 261/DIG. 42 |
| 6,076,739 A * | 6/2000 | Littleford | F24F 8/133 | 236/44 R |
| 6,406,006 B1 * | 6/2002 | Dettling | A47F 3/001 | 261/78.2 |
| 7,082,775 B1 * | 8/2006 | Edwards | A62B 99/00 | 62/171 |
| 7,520,137 B2 * | 4/2009 | Hoffmann | F02C 7/1435 | 60/39.3 |
| 9,120,109 B2 * | 9/2015 | Ganan-Calvo | B05B 7/0475 | |
| 9,441,542 B2 * | 9/2016 | Zhang | B05B 17/0615 | |
| 10,508,821 B2 * | 12/2019 | Jones | F24F 6/14 | |
| 11,493,215 B2 * | 11/2022 | Kleinberger | B05B 17/06 | |
| 2001/0020469 A1 * | 9/2001 | Hunt | F02M 53/06 | 123/549 |
| 2005/0011372 A1 * | 1/2005 | Corrigan | A23L 3/37 | 99/468 |
| 2011/0233289 A1 * | 9/2011 | Bortoletto | F25D 17/042 | 62/274 |
| 2012/0048311 A1 * | 3/2012 | Turner | B60S 3/04 | 134/109 |
| 2017/0170035 A1 * | 6/2017 | Teng | B05B 13/0278 | |
| 2018/0058708 A1 * | 3/2018 | Jones | F24F 6/14 | |
| 2019/0041076 A1 * | 2/2019 | Prewer | F24F 6/14 | |

FOREIGN PATENT DOCUMENTS

| | | | | |
|---|---|---|---|---|
| EP | 2573365 A2 | 3/2013 | | |
| EP | 2573365 A3 | 1/2018 | | |
| KR | 2016113921 A * | 10/2016 | | B05B 1/02 |
| KR | 2016114433 A * | 10/2016 | | B05B 1/02 |
| NL | 1021713 C2 * | 4/2004 | | F24F 11/0008 |
| WO | WO-03008001 A1 * | 1/2003 | | A61L 9/015 |
| WO | 2019075339 | 4/2019 | | |
| WO | WO-2019075339 A1 * | 4/2019 | | A47F 3/001 |

OTHER PUBLICATIONS

Google translation of NL1021713 (Year: 2004).*
"Clamp model 112-85" Comprod Communications LTEE/LTD published Oct. 2016 accessed at <https://comprodcom.com/wp-content/uploads/2016/10/112-85.pdf> (Year: 2016).*
International Search Report and Written Opinion of the International Search Authority for Application No. PCT/US2018/055628, dated Apr. 3, 2019, 21 pages.

* cited by examiner

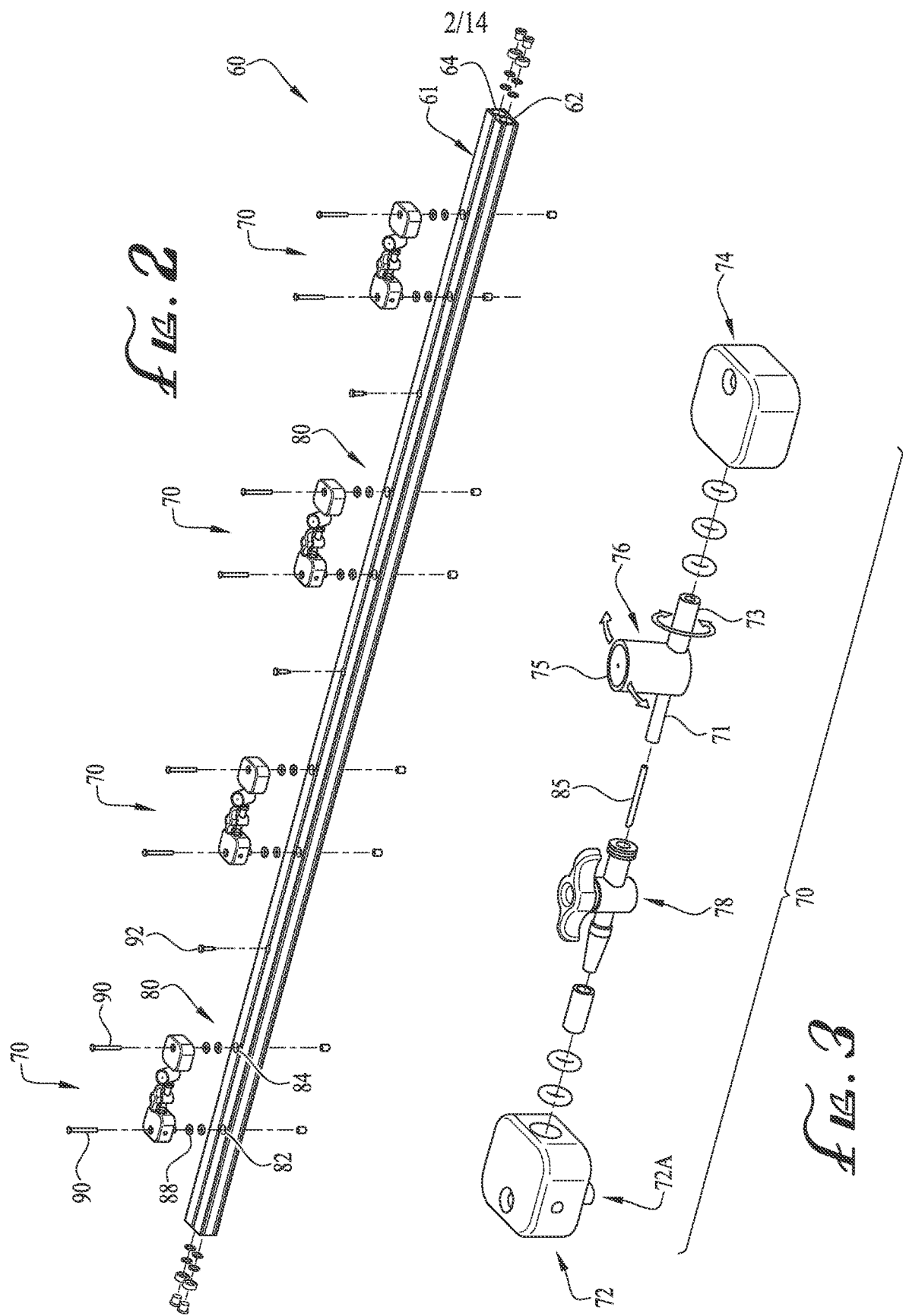

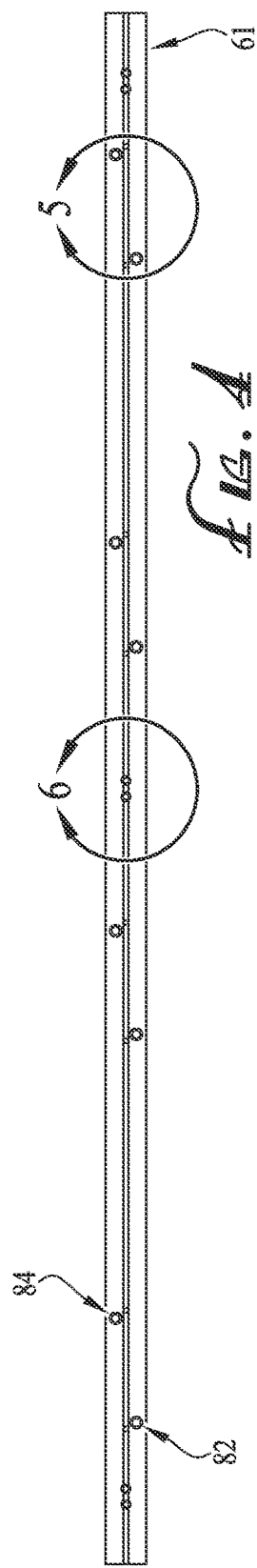
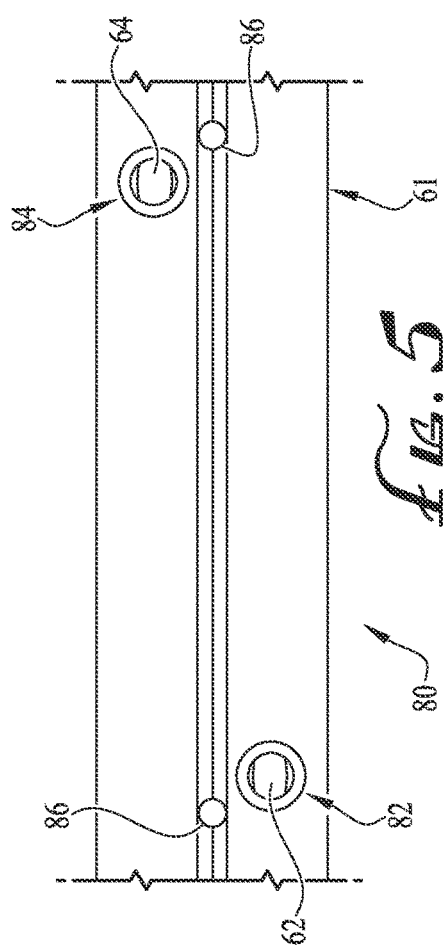
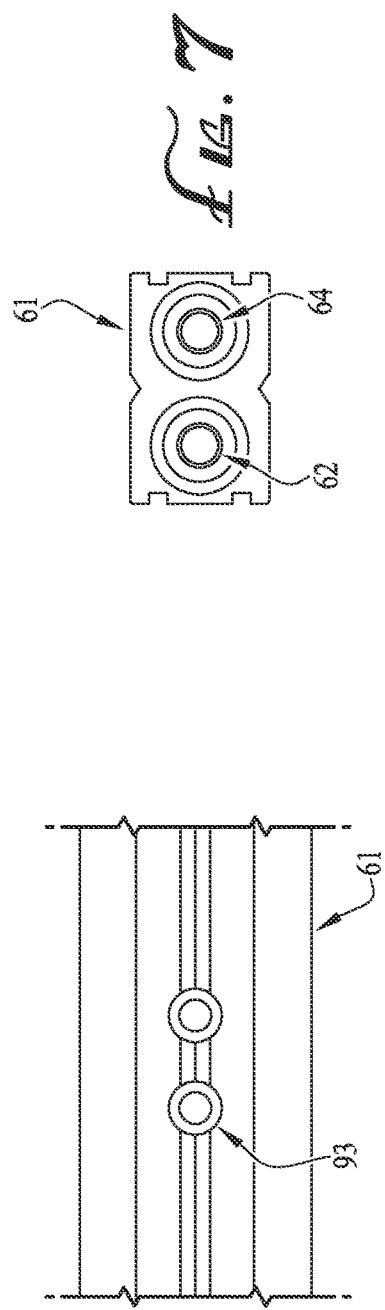
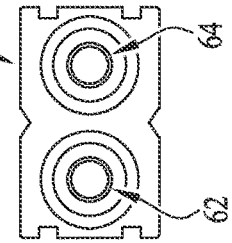

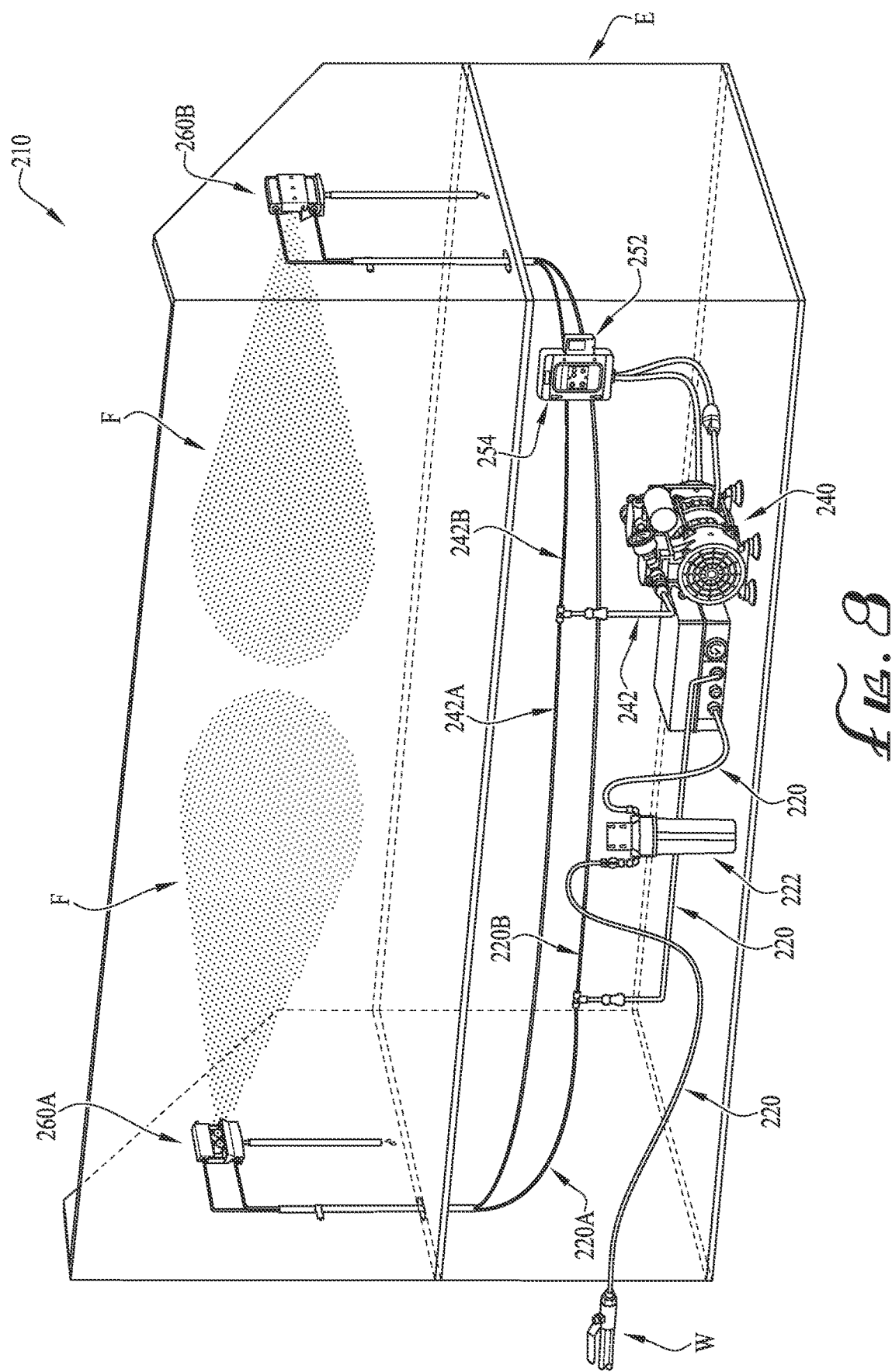

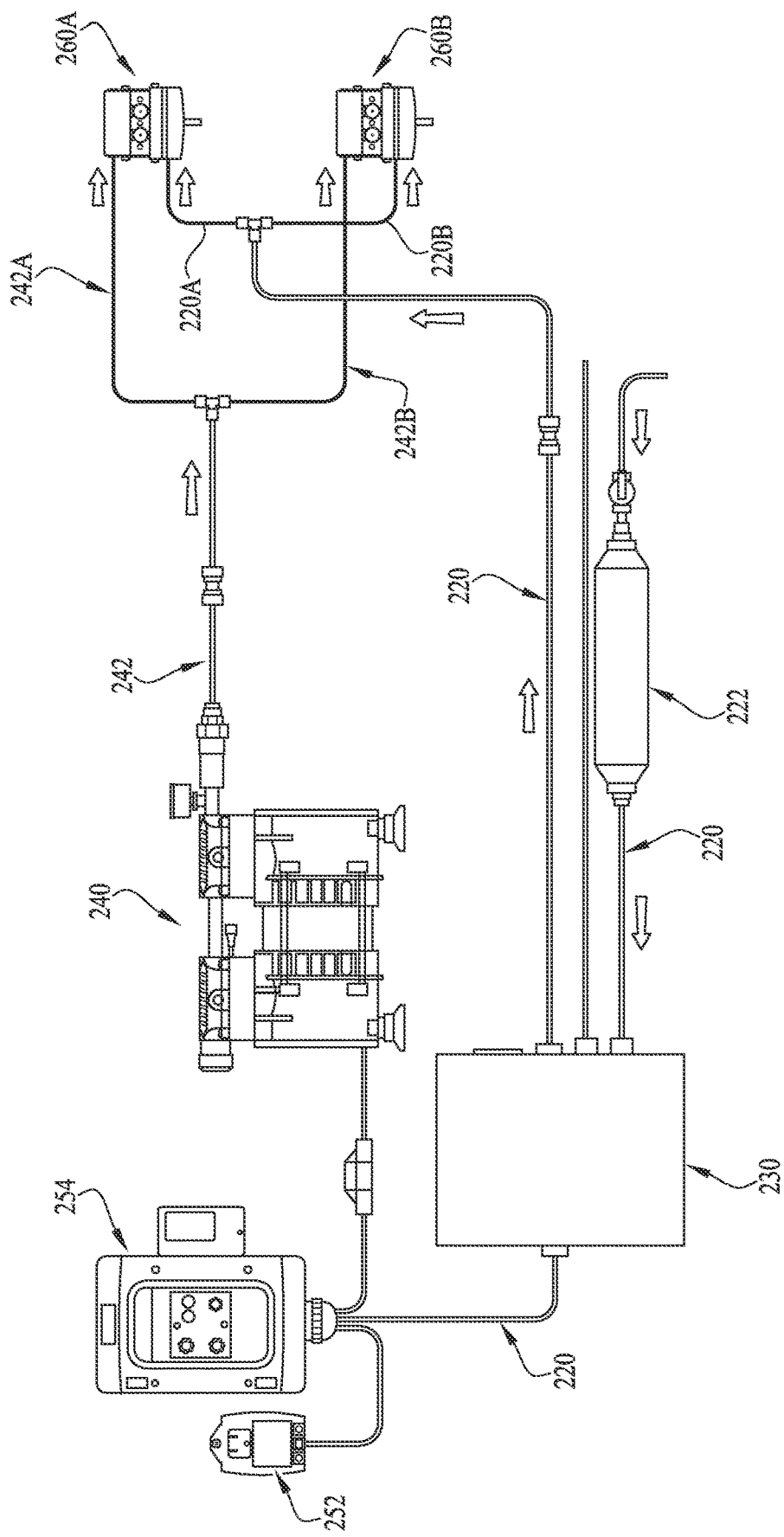

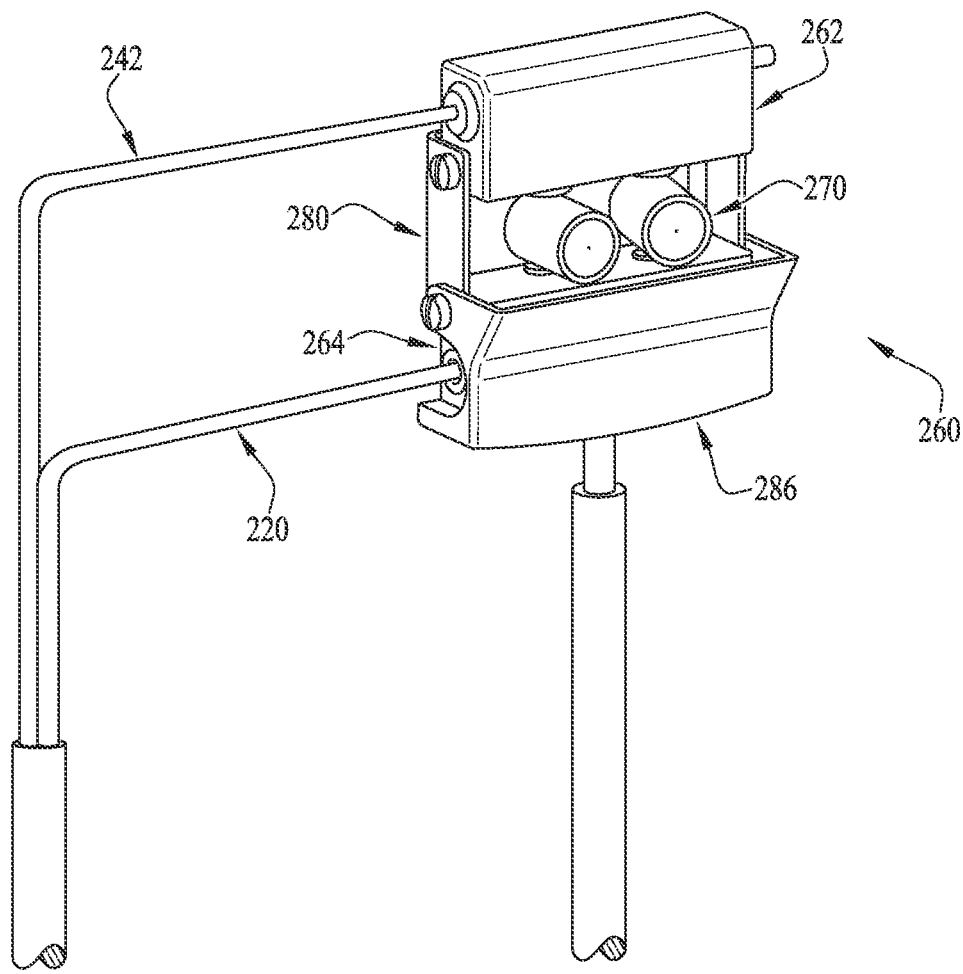

HUMIDIFICATION SYSTEMS

CROSS-REFERENCE TO RELATED APPLICATION APPLICATIONS

This application is a divisional of U.S. Non-Provisional patent application Ser. No. 16/158,945 filed Oct. 12, 2018, which claims the priority benefit of U.S. Provisional Patent Application Ser. No. 62/571,549 filed Oct. 12, 2017, the entirety of which is are hereby incorporated herein by reference for all purposes.

TECHNICAL FIELD

The present invention relates generally to the field of humidification systems, and more particularly to systems and equipment for delivery of fog for humidification of air in closed or open spaces.

BACKGROUND

Maintaining selected humidity levels is desirable for various applications. For example, humidification of supermarket display cases, storage areas, ripening rooms, transport containers, and outdoor growing areas for various types of perishable goods can help maintain product weight, freshness, and appearance. This is the case for a variety of perishables including but not limited to produce, meat, seafood, cheese, deli, floral displays, agricultural products, and other post-harvest organic products. Conventional misting systems are of some benefit in providing humidification, but there remain issues with taste, appearance, and waste.

Accordingly, it can be seen that needs exist for better humidification systems for perishable goods. It is to the provision of solutions meeting these and other needs that the present invention is primarily directed.

SUMMARY

In example embodiments, the present invention provides improved humidification systems and equipment. Example embodiments of humidification and misting systems and equipment according to the present invention deliver a fine, fog spray to maintain desired levels of humidity within spaces such as display cases, ripening rooms, growing areas and storage areas for produce, meat, seafood, cheese, deli, floral displays, agricultural products, and other items. Example embodiments enable easy retrofit installation into existing spaces and enclosures, are easy to maintain, and are readily customized through the provision of modular components to suit various applications. In example applications, the systems and equipment are aesthetically pleasing in appearance, quiet in operation, efficient in water usage, adjustable for increased humidity, and do not produce excessive moisture or wetness on surfaces such as case fronts and floors within and in the vicinity of the humidified space.

In one aspect, the present invention relates to a humidification system including a water delivery subsystem, an air delivery subsystem, a control subsystem, and at least one fog generation subsystem.

In further aspects, the at least one fog generation subsystem includes at least one fog delivery nozzle selected from a water nozzle or water/air combination nozzle, including, but not limited to ultrasonic nozzles.

In still further aspects, the at least one fog generation subsystem includes an air and water delivery bar having an air delivery conduit and a water delivery conduit, and further includes at least one modular nozzle assembly configured to receive pressurized air from the air delivery conduit and to receive pressurized water from the water delivery conduit.

In still further aspects, the at least one fog generation subsystem includes at least one fog generation block, each fog generation block including an air delivery manifold, a water delivery manifold, and one or more sprayer nozzles coupled between the air and water delivery manifolds.

In still further aspects, the at least one fog generation subsystem includes a series of tubing segments interconnecting an array of two or more nozzle assemblies.

In still further aspects, the at least one fog generation subsystem comprises a larger-volume discharging nozzle (e.g., ½ gallon or more per hour) nozzle.

In another aspect, the invention relates to a fog-delivery nozzle for a humidification system. The fog delivery nozzle preferably includes a housing having a nozzle discharge body, an air inlet coupling having an air delivery conduit extending therethrough, and a water inlet coupling having a water delivery conduit extending therethrough. The fog delivery nozzle preferably also includes means for providing a consistent back pressure and flowrate across multiple nozzles in a multi-nozzle array.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 2 is a perspective exploded view of the first fog-generation system of FIG. 1, showing a bar conduit and a series of nozzle assemblies.

FIG. 3 is a perspective exploded view of one of the nozzle assemblies of FIG. 2.

FIG. 4 is a top view of the bar conduit of FIG. 2.

FIG. 5 is an enlarged view of Detail A of the bar conduit of FIG. 4.

FIG. 6 is an enlarged view of Detail B of the bar conduit of FIG. 4.

FIG. 7 is an end view of the bar conduit of FIG. 4.

FIG. 8 is a perspective view of a humidification system according to a second example embodiment of the present invention, showing a second fog-generation system and other major components of the humidification system.

FIG. 9 is a schematic diagram of the humidification system of FIG. 8.

FIG. 10 is a perspective view of the second fog-generation system of FIG. 8, showing manifold blocks and nozzles.

DETAILED DESCRIPTION OF EXAMPLE EMBODIMENTS

Figure 1:
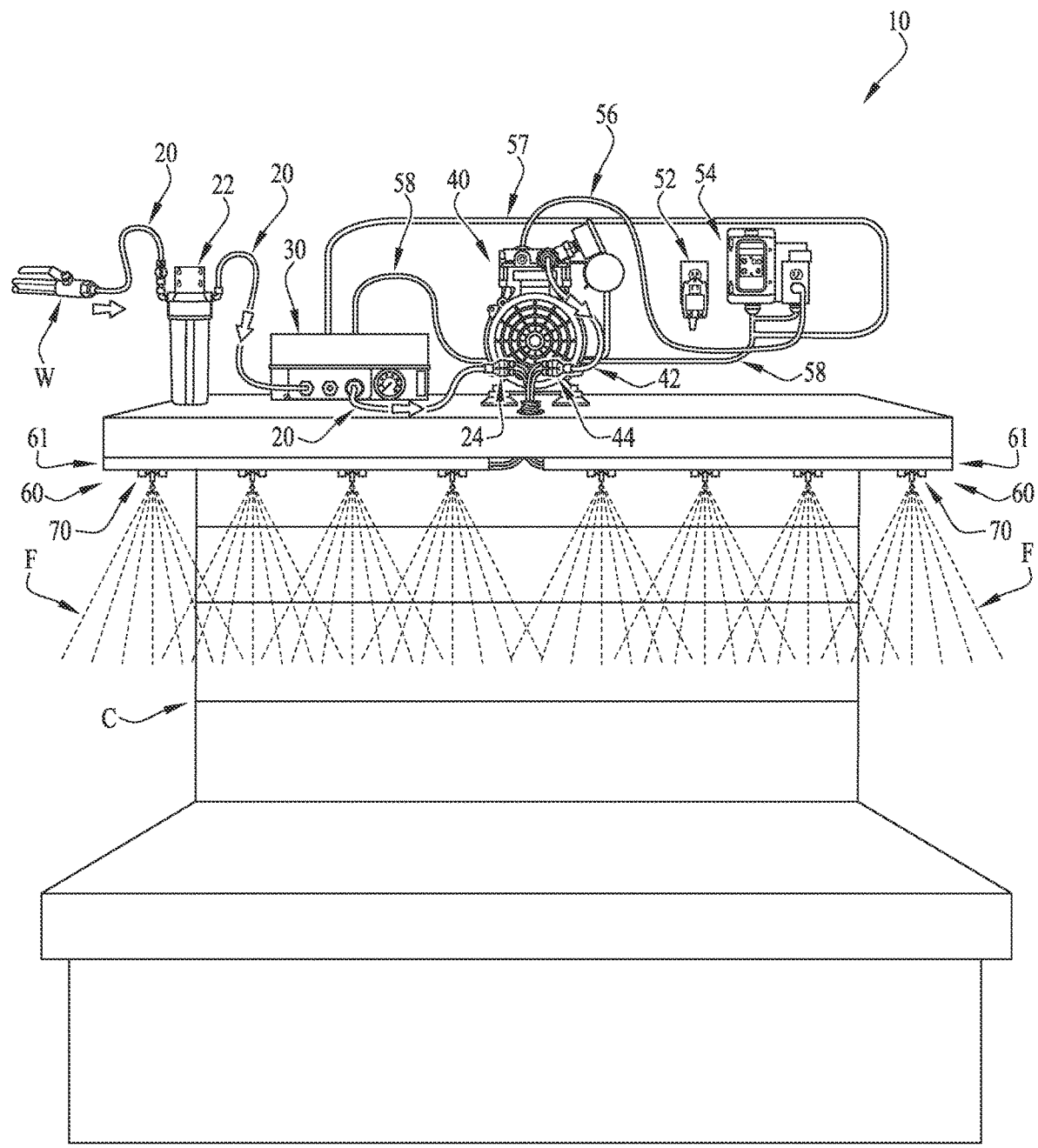
FIG. 1 is a perspective view of a humidification system according to a first example embodiment of the present invention, showing a first fog-generation system and other major components of the humidification system.

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention is described herein with reference to humidification systems for maintaining desired humidity levels of supermarket display cases, storage areas, ripening rooms, transport containers, outdoor growing areas, and the like for various types of perishables including but not limited to produce, meat, seafood, cheese, deli, floral displays, agricultural products, and other post-harvest organic products. As such, these embodiments generate and deliver humidity in the form of a fog. As used herein, the term means a mixture of tiny liquid water droplets suspended in air. Typically, the water droplets have a diameter of about 2 microns to about 30 microns.

Other embodiments of the invention are adapted to deliver the same and/or other fluid mixtures (gas-liquid mixtures, gas-gas mixtures, and/or liquid-liquid emulsions and/or other mixtures, including for example water and/or air as a solvent delivery fluid and a solute treatment agent or substance to be delivered) for the same and/or other applications. For example, this technology can be readily adapted to add humidity, nutrients, disinfectants, vaccines, therapies, and/or other substances to areas such as, but not limited to, greenhouses, growing areas, nurseries, hatcheries, farms, animal-housing facilities, storage rooms, ripening rooms, cigar rooms, wineries, transportation hubs, transportation vehicles, carts and trailers, and other areas in the food industry including growing, harvesting, storing, logistics, and retail of food products. Additionally, the technology can be readily adapted for use in the entertainment industry, amusement parks, the film industry, and/or for special effects. Further, the technology can be readily adapted for use in sanitation, odor control, cooling, treatment, and humidification of areas inhabited by humans, such as medical facilities, laboratories, clean rooms, gathering areas, schools, transportation hubs, airports, restrooms, sanitation and recycling facilities, water treatment facilities, and processing plants. In other embodiments, the systems generate and deliver humidity in the form of a mist including tiny liquid water droplets (larger than in fog, for example about 90 microns) suspended in air.

With reference now to the drawing figures, wherein like reference numbers represent corresponding parts throughout the several views, FIGS. 1-6 show a humidification system 10 according to a first example embodiment of the invention. The humidification system 10 generally includes a water-delivery system, an air-delivery system, a control system, and one or more fog-generation systems 60 (two are depicted). The water-delivery system, the air-delivery system, and the control system can be provided by conventional components in conventional arrangements, including but not limited to those described and shown herein. In the depicted embodiment, the humidification system 10 provides a controlled spray of fog F to a medium-to-large humidified space such as a produce or floral display case C.

As shown in FIG. 1, the water-delivery system includes a water-delivery conduit 20 that is connected to a pressurized water source W, such as a domestic water supply with an on/off valve, and optionally includes a water filter 22 or other treatment device, such as an inline filter. The water-delivery conduit 20 receives water from the pressurized source W and delivers the water to a water supply control unit 30 of the control system and on to the fog-generation system 60.

The air-delivery system includes an air compressor 40, for example of a conventional 110 Volt AC type including an air filter or other treatment device and an airflow valve, and a pressurized air-delivery conduit 42. For example, air compressors 40 rated from about 5 psi to about 50 psi can be used, including central air compressors or smaller stand-alone air compressors. The air compressor 40 intakes ambient air and pressurizes the air for delivery via the pressurized air-delivery conduit 42 on to the fog-generation system 60.

In some embodiments such as that depicted, the humidification system 10 includes a plurality of the fog-generation systems 60. In such embodiments, the water-delivery system can additionally include a splitter 24 for dividing the water-delivery conduit 20 into a plurality of water-delivery conduits 20 each serving one of the fog-generation systems 60, and the air-delivery system can additionally include a splitter 44 for dividing the air-delivery conduit 42 into a plurality of air-delivery conduits 42 each serving another one of the fog-generation systems 60.

The control system includes the water supply control unit 30 and other control components for the air compressor 40 and the water supply control unit 30. In the depicted embodiment, for example, the control system includes a voltage transformer 52 for delivery and maintenance of control power, for example at 24 Volt AC (or DC), and a timer unit 54, for example operating at 24 Volt AC. The control system also includes AC power wiring 56 from the timer to the air compressor 40; AC power wiring 57 from the timer to the water supply control unit 30; and control wiring 58 between the control components for example from the timer unit 54 to the water supply control unit 30. The water supply control unit 30 typically includes one or more pressure regulators for controlling the water discharge pressure and/or flowrate, and one or more solenoid controlled valves or other flow-control components, for example operating in response to electronic signals received from the timer unit 54 to activate and deactivate water and/or airflow to the fog-generation system 60. In typical embodiments, the timer 54 controls the water and air supplies as programmed by sending power to the air compressor 40 and the water supply control unit 30 (e.g., internal solenoid valves). The air compressor 40 then supplies the compressed air and the water supply control unit 30 supplies water to the fog-generating system 60.

Details of one of the fog-generation systems 60 will now be described with particular reference to FIGS. 2-6. The fog-generation system 60 receives the pressurized water from the water supply control unit 30 via the water-delivery conduit 20 of the water-delivery system and the pressurized air from the air-delivery conduit 42 of the air-delivery system. The fog-generation system 60 generally includes an air and water delivery bar 61 and one or more modular nozzle assemblies 70.

The air and water delivery bar 61 includes a pressurized-water header or plenum 62 and a pressurized-air header or plenum 64. The water header 62 is connected to and fed by the water-delivery conduit 20 and the air header 64 is connected to and fed by the air-delivery conduit 42.

In example forms, the air and water delivery bar 60 comprises an extrusion or molding of PVC or other rigid (it supports more than its own weight without deforming), semi-rigid or flexible plastic or polymeric material(s), polyethylene, ABS, or PVC having first and second channels or lumens extending in parallel axially therethrough from end to end forming the water and air headers 62, 64. In example embodiments, the air and water delivery channels have an inside diameter or inner dimension of about 0.20" to about 0.30", for example about a ¼" nominal inside diameter, but larger or smaller channels may be utilized depending on the particular installation or application. In example embodiments, the water and air headers 62, 64 of the delivery bar 61 can be integrally formed as a unitary body, or alternatively can be separately fabricated and joined or mounted parallel and alongside one another. The delivery bar 61 is elongated and can be fabricated in one or more standard lengths (for example about 2', 4', 6', 8', etc.), can be cut to a desired length for customized installation, and/or two or more delivery bars can be coupled end-to-end for extended installations. Various couplings can optionally be provided for straight, angled, branching and other delivery-bar 61 configurations as desired for particular installations.

In example embodiments such as that depicted, a plurality of the modular nozzle assemblies 70 are mounted to and fed by one or more continuous-length runs of one or more of the delivery bars 61. In such embodiments, the water and air headers 62, 64 of the delivery bar 61 include sufficiently high-volume, large flow-capacity channels for delivery of water and air to the modular nozzle assemblies 70, thereby allowing a small or large number of the nozzle assemblies 70 to be fed by a single shared air compressor 40 and water source W. The result is a cost-effective and efficient humidification system 10 for humidifying spaces having various shapes and/or sizes and/or requiring varying degrees of humidification.

Each air and water delivery bar 61 typically includes one or more nozzle receiver portions 80 of the delivery bar for coupling one or more of the modular nozzle assemblies 70 to the delivery bar 61 and providing fluid communication from the delivery bar 61 to the nozzle assemblies 70. Each such bar section or portion 80 includes a water coupling component 82 and an air coupling component 84. The water and air couplings 82, 84 typically include a port, hole, or bore extending through the delivery bar 61 and into fluid communication with the water and air headers 62, 64, respectively, to enable delivery of water and air from the headers to the water and air inlets of the nozzle assemblies. In example embodiments, a plurality or series of the receiver portions 80 are formed in and uniformly spaced along the length of the air and water delivery bar 61, for example spaced about 12" from one another and about 6" from the ends of the delivery bar 61. One or more O-rings or other seal elements 88 are optionally provided in or at the water and air couplings 82, 84 to form a leak-resistant seal between the air and water delivery bar 61 and the nozzle assemblies 70.

In addition, each nozzle receiver portion 80 typically includes one or more (two are depicted) nozzle assembly attachment couplings 86. In the depicted embodiments, for example, the nozzle attachment couplings 86 generally include a port, hole, or bore extending through the delivery bar 61 to secure the respective nozzle assembly to the delivery bar 61. Nozzle attachment fasteners 90 (e.g., screws or other attachment elements) are optionally affixed through the nozzle assembly attachment coupling openings 86 to securely couple the nozzle assemblies 70 onto the delivery bar 61.

The water and air couplings 82, 84 and the nozzle assembly attachment couplings 86 of each receiver portion 80 are typically formed with a uniform spacing and position configured to match the corresponding spacing and position of the cooperating coupling and mounting portions of the modular nozzle assemblies 70 for ease of installation. For instance, the water and air couplings 82, 84 of each receiver portion 80 may be spaced axially about 3.39" and transversely about 0.60" from one another, and the nozzle assembly attachment couplings 86 may be spaced axially about 3.71" from one another, center-to-center, in an example embodiment.

The delivery bar 61 can be mounted to a support structure, for example a medium to large humidified space such as a produce or floral display case C, by conventional mounting elements. In the depicted embodiments, for example, bar mounting screws 92 extend through screw-holes 93 in the delivery bar 61 for such mounting.

Furthermore, in example embodiments the nozzle assemblies 70 each include a water manifold 72 at a first end thereof, an air manifold 74 at a second end thereof, and one or more sprayer heads or nozzles 76 positioned and coupled between, and in fluid communication with, the water and air manifolds (and thus fed indirectly by the corresponding water-delivery and air-delivery conduits). The sprayers 76 may be any type of water nozzle or water/air combination nozzle, including but not limited to ultrasonic nozzles. The manifolds 72 and 74 help provide for minimal flow resistance, in some embodiments such as that depicted they each feed only one sprayer 76, and in other embodiments they branch/parallel feed multiple sprayers. An optional stopcock or valve 78 can be provided for example between the water manifold 72 and the sprayer 76. One or more O-rings, bushings, seals, gaskets or other sealing elements are optionally provided to form a leak-resistant seal between components of the nozzle assembly 70. A capillary tube or flow restrictor 85 is optionally provided to control and provide uniform water flow rate to the sprayer 76. The capillary can come in different sizes and is not limited to what is shown in the drawing.

The nozzle assemblies 70 each further include a water transfer coupling 72A and an air transfer coupling 74A for delivering water and air from the delivery bar 61 to the respective water and air manifolds 72, 74. Each water transfer coupling 72A is configured for cooperatively coupling with and providing fluid communication between the water channel 62 of the delivery bar 61 and the water manifold 72. Similarly, each air transfer coupling 74A is configured for cooperatively coupling with and providing fluid communication between the air channel 64 of the delivery bar 61 and the air manifold 74. In the depicted embodiment, for example, the water and air transfer couplings 72A, 74A are in the form of tubes or stems that extend from the respective water and air manifolds 72, 74 and are received into the respective water and air coupling openings 82, 84 of a corresponding nozzle assembly receiver 80 of the delivery bar 61. In other embodiments, the water and air transfer couplings are received into respective water and air coupling openings of the water and air manifolds or are provided by other fluid-carrying elements.

Figure 3A:
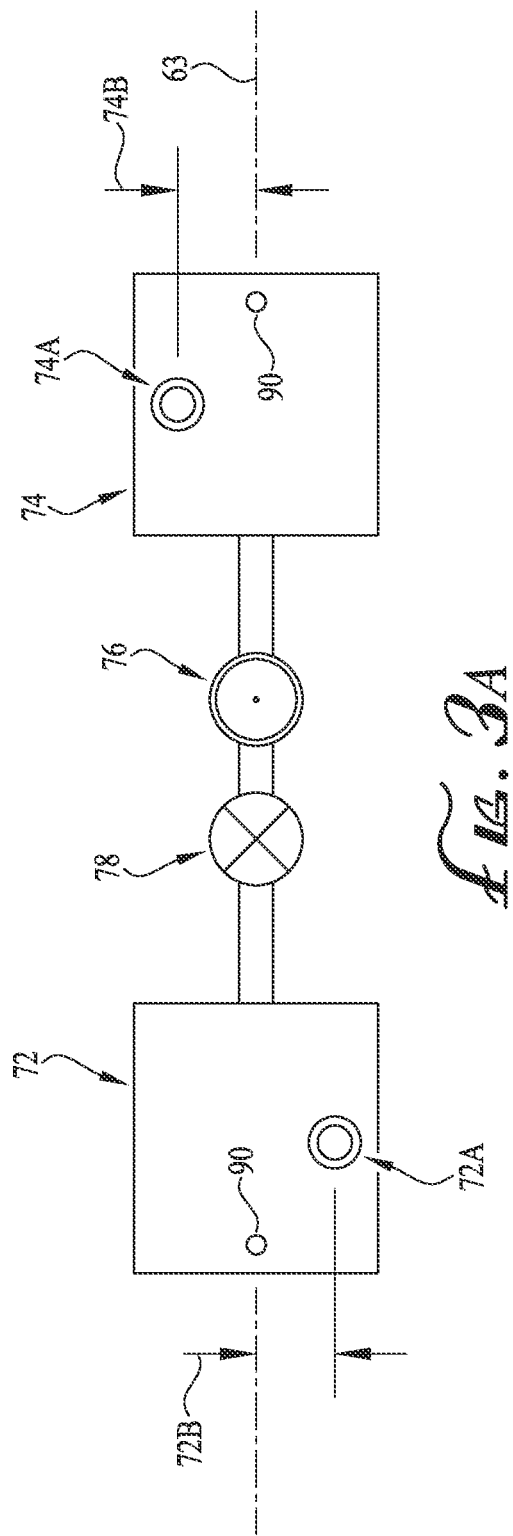
FIG. 3A is a bottom view, in schematic form, of one of the nozzle assemblies of FIG. 2.

The water manifold 72, the air manifold 74, and the sprayer 76 of each nozzle assembly 70 are arranged generally in-line with each other, for example substantially parallel with a longitudinal axis or centerline 63 of the delivery bar 61, with the water manifold 72 and the air manifold 74 and spaced apart and with the sprayers 76 positioned between and in fluid communication with them (see, e.g., FIG. 3A). The water and air channels 62 and 64 of the delivery bar 61 are typically arranged in a side-by-side configuration on opposite sides of the longitudinal axis or centerline 63 of the delivery bar 61. As such, the water and air transfer couplings 72A, 74A are typically positioned on opposite sides of the longitudinal axis or centerline 63 of the delivery bar 61, for example spaced therefrom by an offset or transverse distance 72B, 74B. This arrangement provides a nozzle assembly 70 that is low-profile, compact, and non-obtrusive, and is thus relatively easy to install and maintain.

In addition, each sprayer head or nozzle 76 of typical embodiments is separately rotationally mounted to and between, and in fluid communication with, the water and air manifolds 72, 74 to allow for individual angular adjustment and control of the direction of the spray F of fog from each nozzle assembly 70 (as indicated by the angular arrows of FIG. 3). In example embodiments, the sprayer 76 can be, but is not limited to, a generally T-shaped element having a water inlet 71 at one side, an air inlet 73 at the other side and generally axially aligned with the water inlet 71 to define a rotational axis, and a spray discharge or outlet 75 between the water and air inlets for discharging a fog spray F of fine water droplets entrained within an airflow.

FIGS. 8-11 show a humidification system 210 according to a second example embodiment of the invention. The humidification system 210 generally includes a water-delivery system, an air-delivery system, a control system, and one or more fog-generation systems 260 (two are depicted). The water-delivery system, the air-delivery system, and the control system can be provided by conventional components in conventional arrangements, including but not limited to those described and shown herein. In the depicted embodiment, the humidification system 210 provides a controlled fog F to a small-to-medium size humidified space of an enclosure E such as a meat or seafood storage and display case, and alternatively may be used for humidifying larger spaces.

Referring particularly to FIGS. 8-9, the water-delivery system, the air-delivery system, and the control system can have the same general type and configuration of components as in the first embodiments. As such, the water-delivery system can include a water-delivery conduit 220, which receives water from a pressurized source W, and a water filter 222 or other treatment device, for delivering water to a water supply control unit 230 and on to the fog-generation systems 260. The air-delivery system can include an air compressor 240, which intakes ambient air, optionally filters or otherwise treats the air, and pressurizes the air for delivery via one or more pressurized air-delivery conduits 242 to the fog-generation systems 260. And the control system can include a relay 252 for delivery of control power, a timer unit 254, and the water supply control unit 230, which can include one or more pressure regulators for controlling the water discharge pressure and/or flowrate, and one or more solenoid-controlled valves or other flow-control means, for example operating in response to electronic signals received from the timer unit 254 to activate and deactivate water and/or air flow to the fog-generation systems 260. Control and power wiring is provided for connecting and operating these control components. Additional details of the structure and operation of these components are not provided for brevity and to avoid duplication.

In addition, in the depicted embodiment the common or shared water-delivery conduit 220 is split by a T-coupling or splitter to deliver water to first and second subsidiary water-delivery conduits 220A and 220B to supply water to first and second fog generation blocks 260A, 260B, respectively. Similarly, the common or shared air-delivery conduit 242 is split by a T-coupling or splitter to deliver pressurized air to first and second subsidiary air-delivery conduits 242A and 242B to supply air to first and second fog-generation systems 260A, 260B, respectively (collectively, the "fog-generation systems 260"). In alternate embodiments, the humidification system can include one, two, three, or more fog-generation systems 260 in a series or parallel array (e.g., with each of the series or parallel fog-generation systems including multiple parallel configured nozzle assemblies), with individual air and water supply lines (and corresponding splitters for the water and air conduits), and/or various desired arrangements or configurations. In alternate embodiments, there can be one or multiple, including more than two, subsidiary water-delivery and air-delivery conduits.

Figure 11:
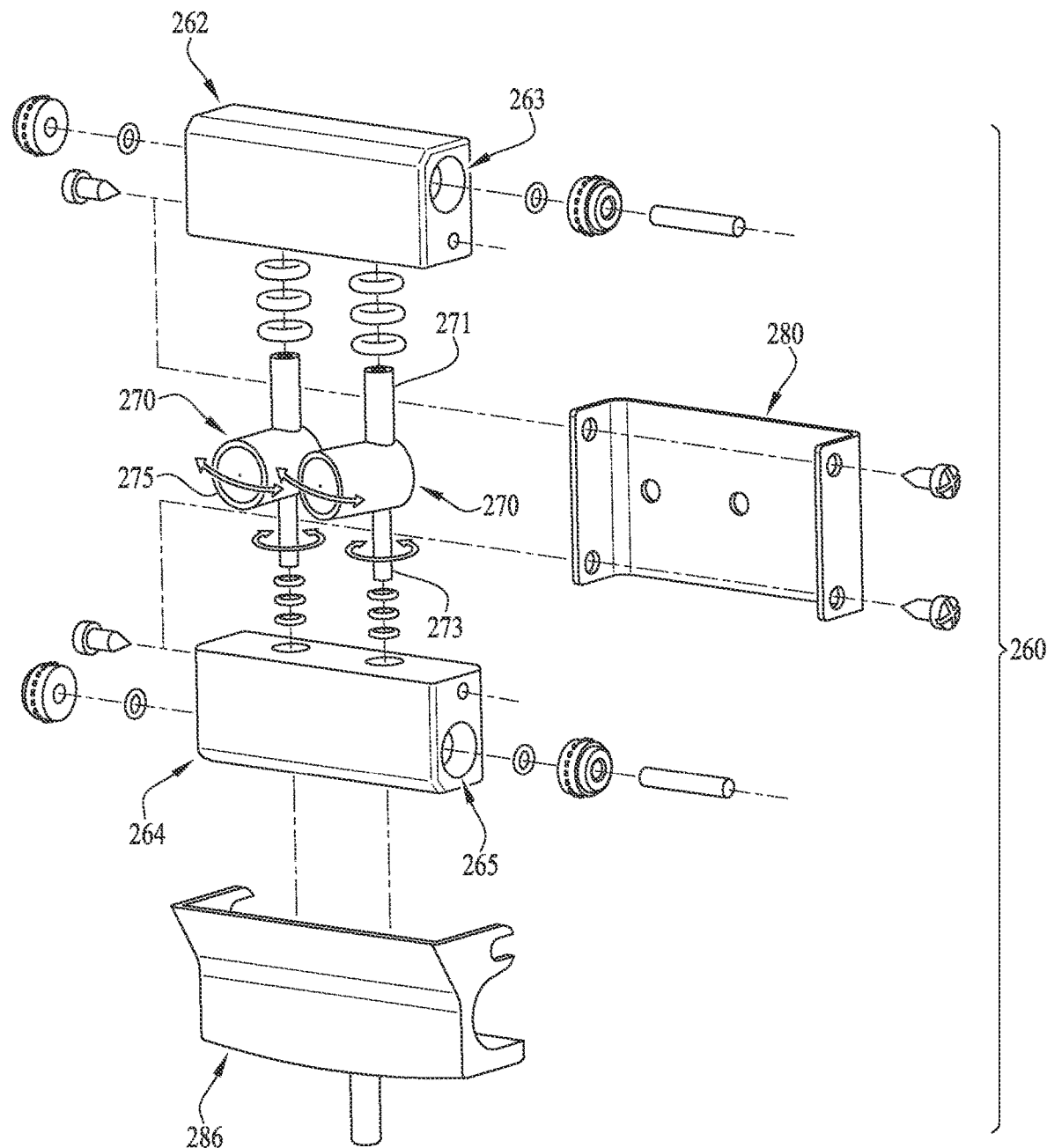
FIG. 11 is a perspective exploded view of the second fog-generation system of FIG. 10.

Referring particularly to FIGS. 10-11, each of the fog-generation systems 260 has a block format and includes an air-delivery manifold 262, a lower water-delivery manifold 264, and one or more sprayer heads or nozzles 270 positioned and coupled between the air and water delivery manifolds 262, 264. The air-delivery manifold 262 can be positioned above (as depicted), below, beside, angled, etc. relative to the water-delivery manifold 264. The sprayer heads or nozzles 270 may include any type of water nozzle or water/air combination nozzle, including, but not limited to ultrasonic nozzles.

O-rings, bushings, seals, gaskets or other sealing elements are optionally provided to form a leak-resistant seal between components of the fog-generation systems 260. The fog-generation systems 260 optionally further include a mounting bracket 280 for attachment to a support structure or enclosure E, such as for example a wall of a small-to-medium size humidified space within a meat or seafood storage and display case or of a larger humidified space within a meat or seafood storage room. The fog-generation systems 260 optionally further include a drip pan 286 to collect and drain any residual liquid, for example at the end of a fog-delivery cycle as the system 260 pressures down.

In the depicted embodiment, two sprayers 270 are positioned and coupled between the air and water delivery manifolds 262, 264. As such, the air manifold 262 and the water manifold 264 are spaced apart in a fixed relationship with the sprayers 270 positioned between and in fluid communication with them. Also, the air manifold 262 includes an air channel or lumen 263 and the water manifold 264 includes a water channel or lumen 265 that is typically substantially parallel to the air channel 263, with each of the sprayers 270 tapped into and fed from the opposite direction by the air and water channels 263, 265. This arrangement provides a fog-generation system 260 that is low-profile, compact, and non-obtrusive, and is thus relatively easy to install and maintain. In alternate embodiments, one, two, three, or more sprayer heads or nozzles may be coupled between the air and water delivery manifolds 262, 264. The length of the air and water delivery manifolds 262, 264 is selected to accommodate the number of sprayers 270 included in the fog-generation system 260.

In addition, each sprayer head or nozzle 270 of typical embodiments is separately rotationally mounted to and between, and in fluid communication with, the air and water manifolds 262, 264 to allow for individual angular adjustment and control of the direction of the spray F or the fog from each sprayer 270 (as indicated by the angular arrows of FIG. 11). In example embodiments, each sprayer 270 can be, but is not limited to, a generally T-shaped element having a water inlet 271 at one side, an air inlet 273 at the other side and generally axially aligned with the water inlet 271 to define a nozzle rotational axis, and a spray discharge or outlet 275 between the water and air inlets for discharging a fog spray F of fine water droplets entrained within an airflow.

FIGS. 12-14B show a humidification system 310 according to a third example embodiment of the invention. The humidification system 310 generally includes a water-delivery system, an air-delivery system, a control system, and one or more fog-generation systems 360 (two are depicted). The water-delivery system, the air-delivery system, and the control system can be provided by conventional components in conventional arrangements, including but not limited to those described and shown herein. In the depicted embodiment, the humidification system 310 provides a controlled spray of fog F to a humidified open or closed space S such as for example a produce, meat, seafood, cheese, deli or floral display case or room.

Figure 12:
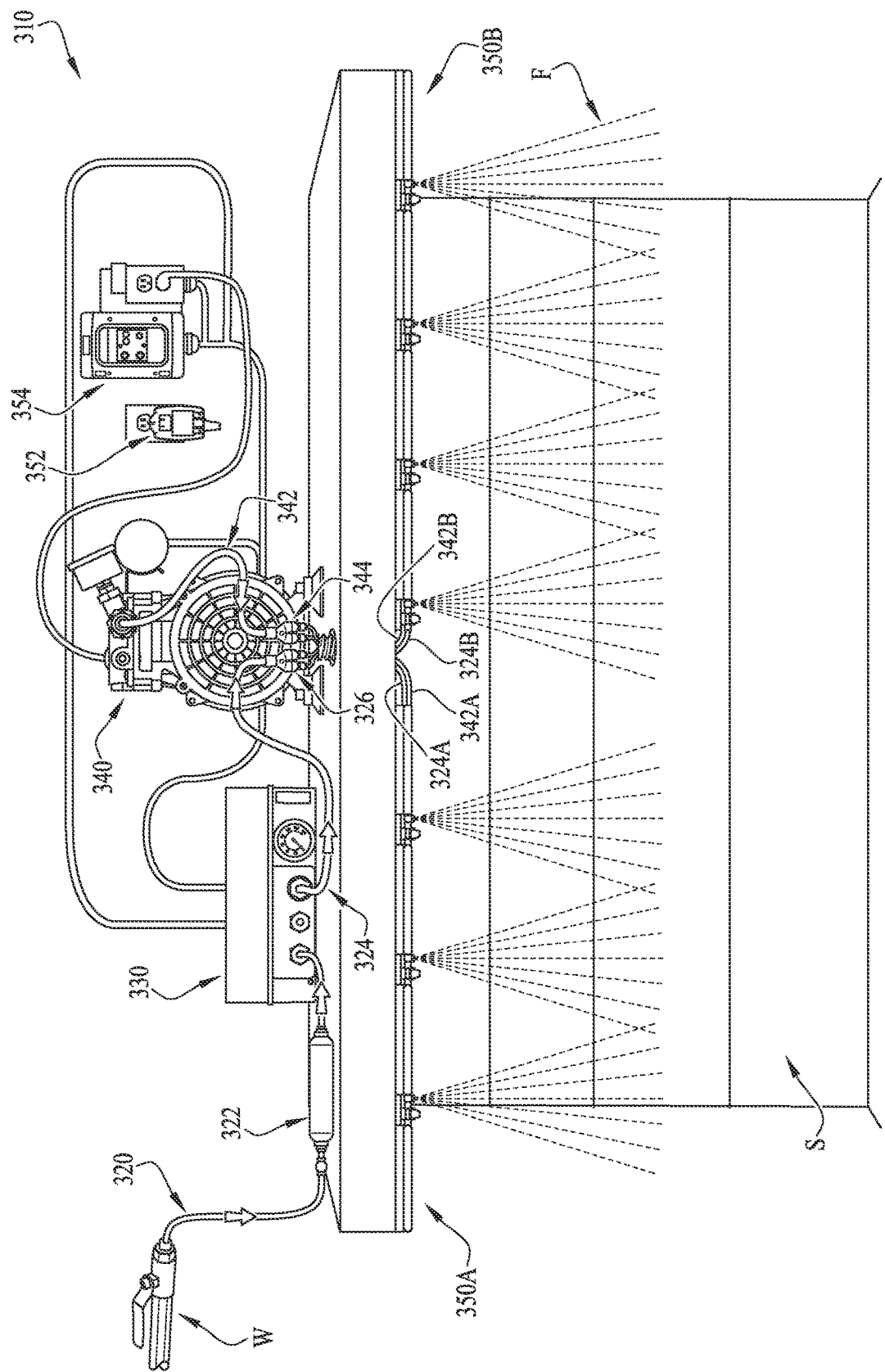
FIG. 12 is a perspective view of a humidification system according to a third example embodiment of the present invention, showing a third fog-generation system and other major components of the humidification system.

Referring particularly to FIG. 12, the water-delivery system, the air-delivery system, and the control system can have the same general type and configuration of components as in the first embodiments. As such, the water-delivery system can include a water-delivery conduit 320, which receives water from a pressurized source W, and a water filter 322 or other treatment device, for delivering water to a water supply control unit 330 and on to the fog-generation systems 350. The air-delivery system can include an air compressor 340, which intakes ambient air, optionally filters or otherwise treats the air, and pressurizes the air for delivery via one or more pressurized air-delivery conduits 342 to the fog-generation systems 350. And the control system can include a voltage transformer 352 for delivery of control power, a timer and relay unit 354, and the water supply control unit 330, which can include one or more pressure regulators for controlling the water discharge pressure and/or flowrate, and one or more solenoid-controlled valves or other flow-control means, for example operating in response to electronic signals received from the timer unit 354 to activate and deactivate water and/or air flow to the fog-generation systems 350. Control and power wiring is provided for connecting and operating these control components. Additional details of the structure and operation of these components are not provided for brevity and to avoid duplication.

In addition, in the depicted embodiment the common or shared water-delivery conduit 324 is split by a T-coupling or splitter to deliver water to first and second subsidiary water-delivery conduits 324A and 324B to supply water to first and second fog generation systems 350A, 350B, respectively. Similarly, the common or shared air-delivery conduit 342 is split by a T-coupling or splitter to deliver pressurized air to first and second subsidiary air-delivery conduits 342A and 342B to supply air to first and second fog-generation systems 350A, 350B, respectively (collectively, the "fog-generation systems 350"). In alternate embodiments, the humidification system can include one, two, three, or more fog-generation systems 350 in a series or parallel array (e.g., with each of the series or parallel fog-generation systems including multiple series configured nozzle assemblies), with individual air and water supply lines (and corresponding splitters for the water and air conduits), and/or various desired arrangements or configurations. In alternate embodiments, there can be one or multiple, including more than two, subsidiary water-delivery and air-delivery conduits. The water and air conduits may be provided as single feeds (e.g., at one end of each fog-generation system 350), double feeds (e.g., at both ends), or multiple feeds (e.g., between the ends and feeding outward).

Figure 13:
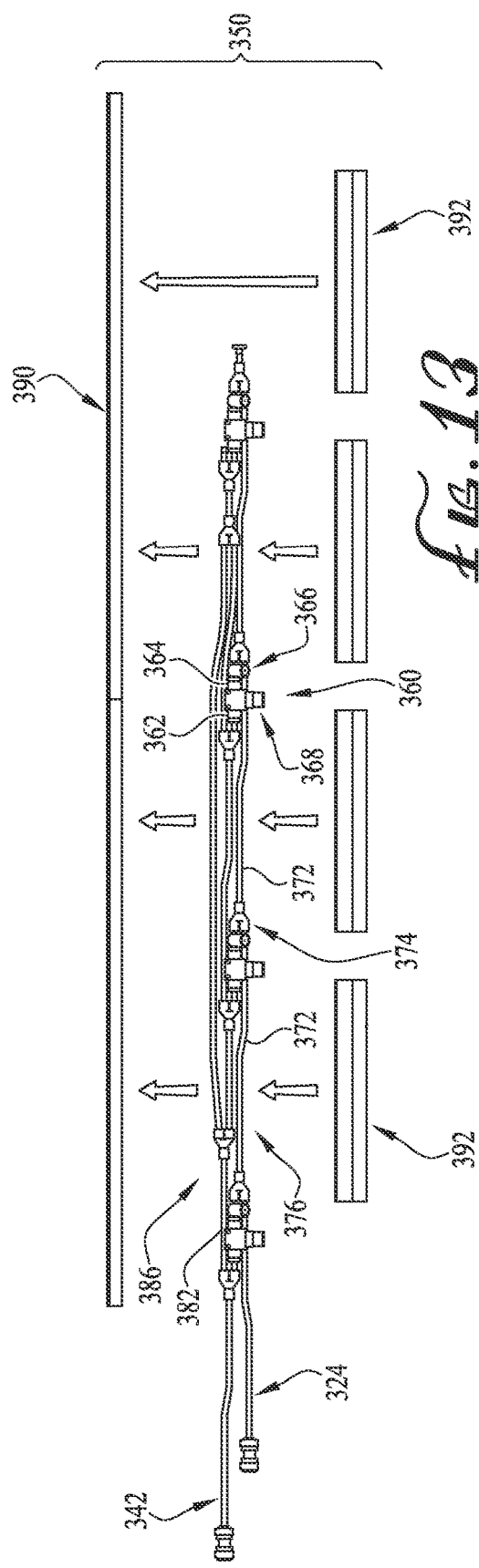
FIG. 13 is a partially exploded side view of the third fog-generation system of FIG. 12, showing a track, conduits, and nozzles.
Figure 14A:
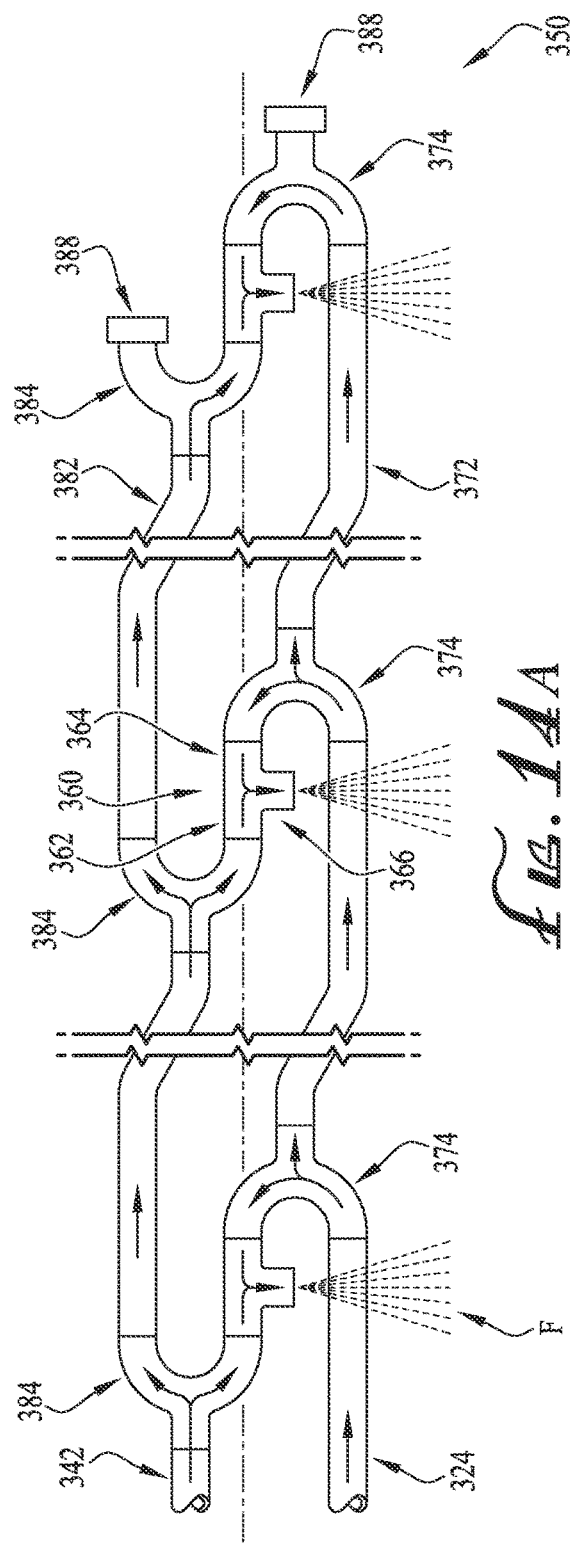
FIG. 14A is a schematic flow diagram of the third fog-generation system of FIG. 12.
Figure 14B:
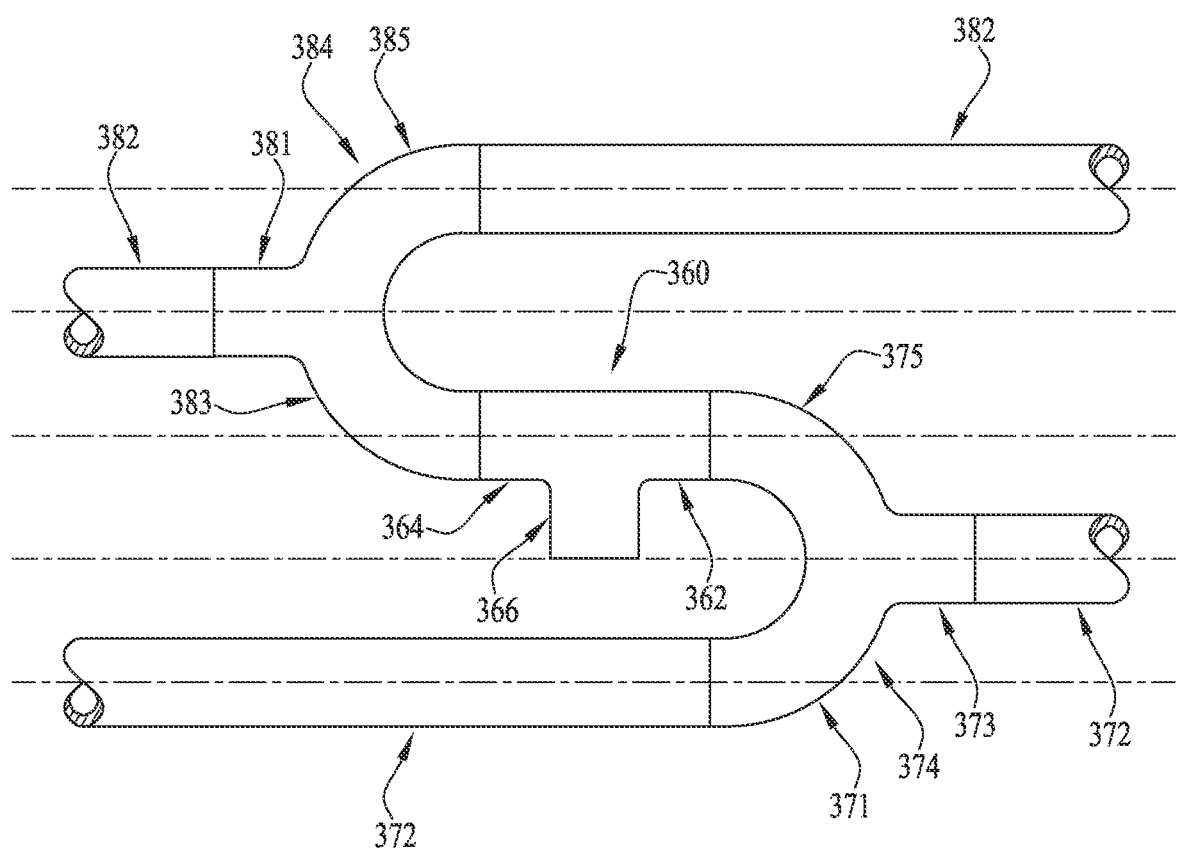
FIG. 14B shows a detail portion of the third fog-generation system of FIG. 14A.

Referring particularly to FIGS. 13-14B, each fog-generation system 350 includes a series of tubing segments interconnecting via flow dividers or splitter couplings and an array of two or more nozzle assemblies 360. In the depicted embodiment, four of the nozzle assemblies 360 and the corresponding number of tube segments and splitters are included in each fog-generation system 350. In alternate embodiments, one, two, three, four, or more nozzle assemblies, etc. may be included in each fog-generation system.

Each nozzle assembly 360 includes a water inlet 362 at a first end thereof, an air inlet 364 at a second end thereof, a sprayer head or nozzle 366 positioned and coupled between the water and air inlets 362, 364, and optionally a stopcock or valve 368 (e.g., between the water inlet and the sprayer). One or more O-rings, bushings, seals, gaskets, or other sealing elements are optionally provided to form a leak-resistant seal between components of the nozzle assembly 360. The sprayer heads 366 are optionally rotationally mounted (e.g., directly to the respective flow splitters), or the tubing is sufficiently flexible that the nozzle assemblies can be rotated and the tubing twists, to allow positional adjustment to control the direction of discharge of fog F within the humidified space S. The sprayer heads or nozzles 366 may include any type of water nozzle or water/air combination nozzle, including but not limited to ultrasonic nozzles.

The tubing segments and splitter couplings include water tubing 372 and water splitters 374 arranged and interconnected in series to form a water-feed line or header 376 that is connected to and fed by the water-delivery conduit 324, and air tubing 382 and air splitters 384 arranged and interconnected in series to form an air-feed line or header 386 that is connected to and fed by the air-delivery conduit 342. The tubing 371, 382 can be conventional flexible tubing for pressurized water and/or air (e.g., 6 mm OD poly tubing).

The water and air splitters 374, 384 each include three or more legs (at least one input and at least two outputs), and as such are referred to herein as two-way splitters (e.g., Y-configuration), though three-way or other splitters can be used and the tubing arrangement modified accordingly. Also, the water and air splitters 374, 384 typically include a conventional connector at each of the leg ends, though the connectors can be separately provided in some embodiments.

At least two of the nozzle assemblies 360 are serially arranged in a substantially parallel alignment, and typically all or most of them are serially arranged in substantially axial alignment (e.g., for being housed in a generally linear segment of a track-and-cover assembly), with the water and air inlets 362, 364 so aligned (see FIG. 14A). An air splitter 384 is provided for feeding each nozzle assembly 360 from a feed side (the left in FIGS. 13-14B), with the splitter oriented with one leg on the feed side and two legs on an opposite downstream side. The feed-side leg 381 is the air inlet connected to the air-feed tubing 382, one of the downstream legs 383 is one air outlet connected to (directly or indirectly) and feeding the air inlet 364 of one of the nozzle assemblies 360, and the other of the downstream legs 385 is the other air outlet connected to and continuing downstream with the water-feed tubing 372. Also, a water splitter 374 is provided for feeding each nozzle assembly 360 from the opposite downstream side (the right in FIGS. 13-14B), with the splitter oriented with two legs on the feed side and one leg on the opposite downstream side. One of the feed-sides leg 371 is the water inlet connected to the water-feed tubing 372, the downstream leg 373 is one water outlet connected to and continuing downstream with the water-feed tubing 372, and the other of the feed-side legs 375 is the other water outlet connected to (directly or indirectly) and feeding the water inlet 362 of one of the nozzle assemblies 360.

Thus, in typical embodiments the water and air splitters 374, 384 are oppositely arranged (facing each other) and positioned on opposite sides of the respective nozzle assembly 360 (one at each inlet side). So the splitters 374, 384 are typically oriented with their two-leg sides facing each other, with two-leg sides of the splitters thus having axially aligned legs. Also, in typical embodiments all three legs of each the splitters 374, 384 have substantially parallel axes, so the air inlet leg and the water outlet leg of the splitters are substantially parallel with the air inlet and the water inlet of the nozzle assemblies 260 (seen FIG. 14B), though they are not typically planar and more typically the splitters are pivoted and angled (e.g., by about 120 degrees to about 150 degrees) relative to the nozzle inlets axis to fold the tubing over into a more compact space.

The water and air splitters 374, 384 are typically located adjacent and connected directly to the respective nozzle assembly 360, though alternatively they can be positioned a short distance away and indirectly connected for example by an additional length of tubing. Also, the fog-generation system 350 is described with the air splitters 384 feeding the respective nozzle assemblies 360 from the feed side and with the water splitters 374 feeding the respective nozzle assemblies 360 from the opposite downstream side, though in other embodiments this is switched with the water splitters feed-side and the air splitter downstream-side. This arrangement provides a fog-generation system 350 that is low-profile, compact, and non-obtrusive, and is thus relatively easy to install and maintain.

Plugs 388 can be used on the end-of-the-line water and air splitters 374, 384 (e.g., the right-most splitters in FIG. 14A).

In some embodiments, the feed-side splitter (in this case, the water splitter) at the end of the feed line is eliminated and instead a conventional connector used to couple the last tube segment to the last sprayer. In some embodiments, instead of including a plug, that leg of the splitter can be connected to a secondary water or air source.

In addition, some embodiments such as that depicted include an air-feed bypass tubing and two addition splitters at its ends to connect the bypass tubing into the air-feed tubing, thereby bypassing one or more of the splitters in the air-feed line, to assist in maintaining a constant pressure.

The fog-generation system 350 optionally also includes a mounting track or clamp (e.g., a length of U-shaped channel) 390 configured for mounting to a support structure such as for example a produce, meat, seafood, cheese, deli or floral display case, and one or more cover panels 392 configured to attach to the mounting bracket or clamp 390 and cover the tubing sections between the nozzle assemblies 360. The track-and-cover assembly is typically generally linear, as depicted, but alternatively can include bends (e.g., between linear sections) and/or curves for conforming to the shape of a mounting surface (e.g., a wall or panel of the display case), particularly for embodiments in which the tubing is flexible.

Figure 15:
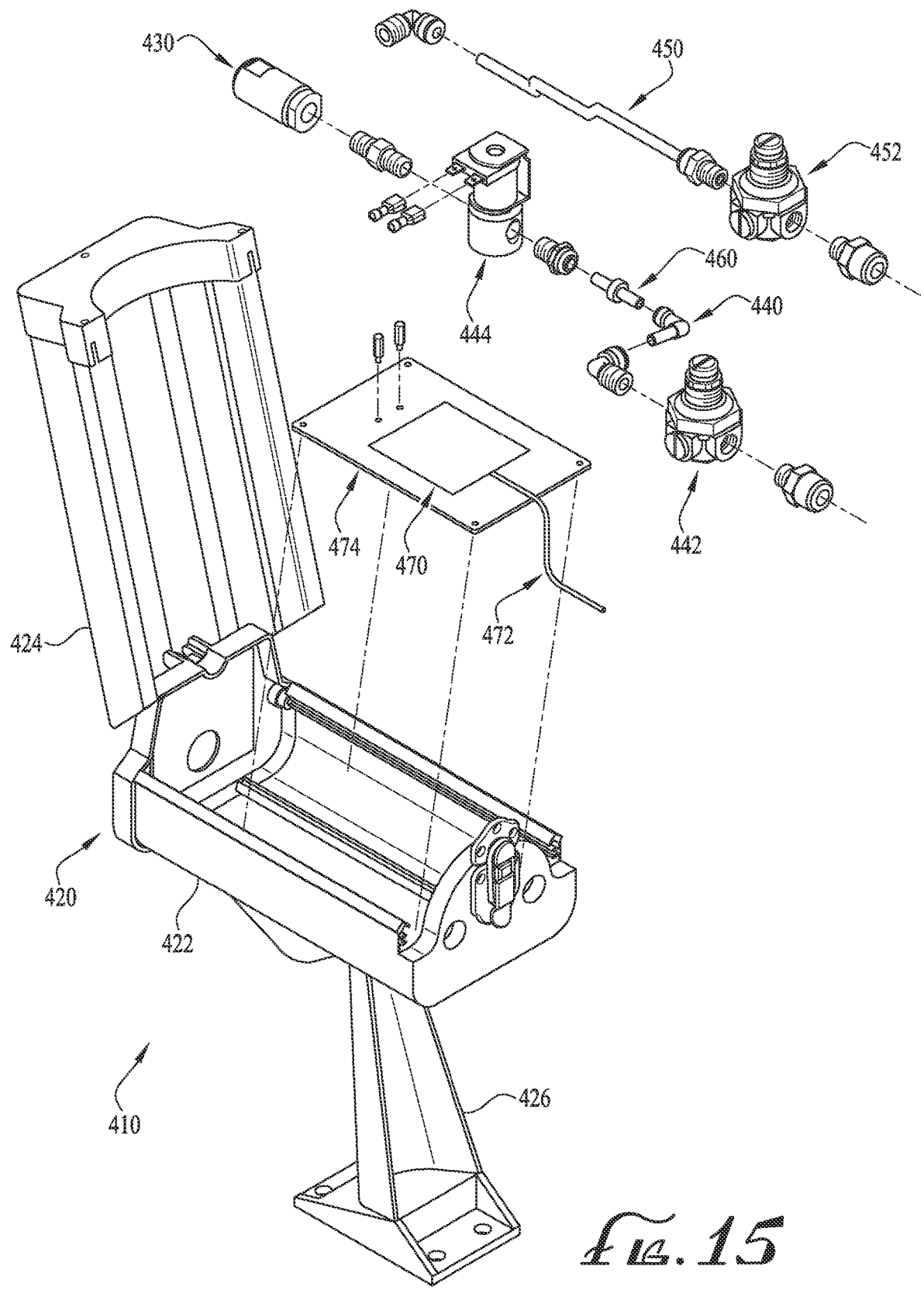
FIG. 15 is an exploded perspective rear view of a fourth fog-generation system of a humidification system according to a fourth example embodiment of the present invention.
Figure 16:
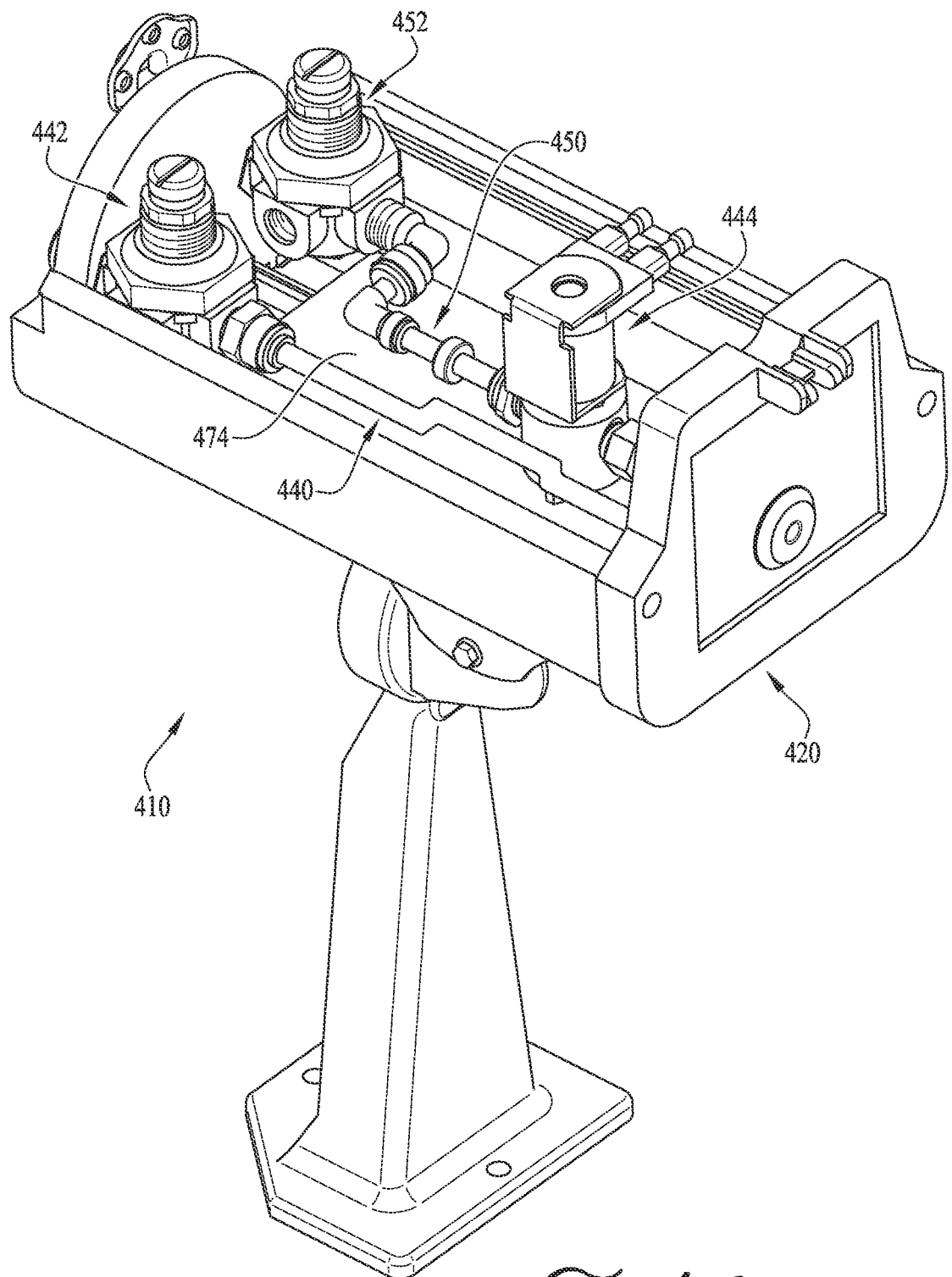
FIG. 16 is an assembled perspective front view of the fourth fog-generation system of FIG. 15, with the housing cover removed to reveal the internal components providing a large-volume fog delivery arrangement.
Figure 17:
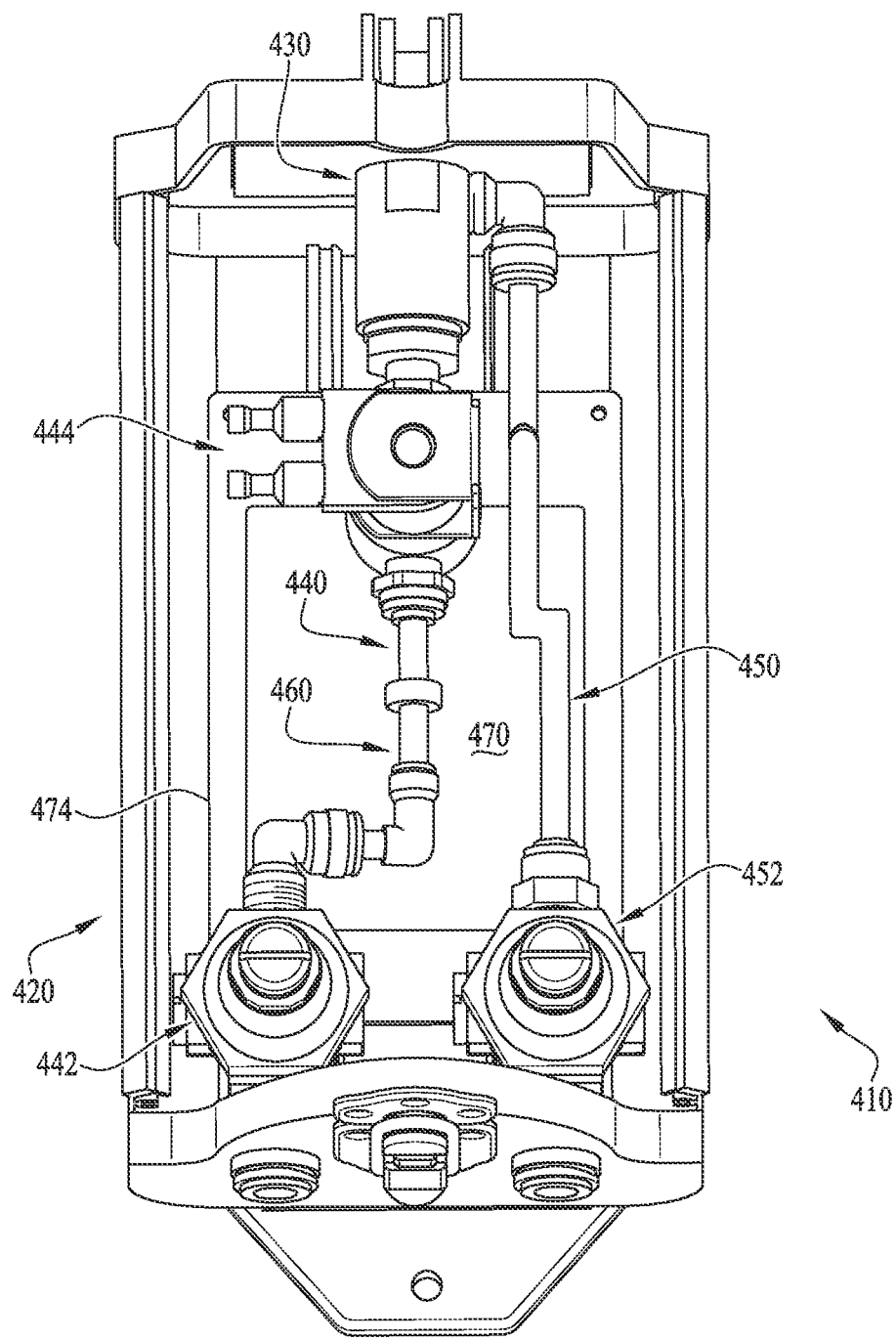
FIG. 17 is a perspective rear top view of the fourth fog-generation system of FIG. 16.

FIGS. 15-17 show a fog-generation system 410 of a humidification system according to a fourth example embodiment of the invention. The system 410 generally includes a fog or humidification discharging high-flow volume nozzle 430, a pressurized water-delivery conduit 440, a pressurized air-delivery conduit 450, and a housing 420 containing those internal components. The high-volume nozzle 430 is preferably a large-capacity, high flowrate (e.g., 0.5-1.5 gallons per hour) nozzle capable of delivering a fog spray for humidification of large to very large spaces, such as for example storage rooms or warehouses. The nozzle 430 can be any type of conventional water nozzle or water/air combination nozzle, including but not limited to an ultrasonic nozzle. Pressure regulators 442, 452 are optionally provided in the water and air delivery conduit flowpaths, and a solenoid-controlled valve 444 is optionally provided in the water-delivery conduit flowpath.

In example embodiments, the housing 420 is configured (sized and shaped) to have an external visual appearance that is similar to a surveillance or security camera housing. This allows the unit to blend in with its surroundings and/or present the appearance of increased security to discourage pilfering or tampering with stored products. For example, the housing 420 can include a casing 422, a hinged cover 424 (e.g., that opens to expose the internal components), and a mounting arm or bracket 426, all made of a plastic or metal (e.g., stainless steel).

In addition, an emitter or dripper 460 (e.g., a pressure compensating or non-compensating dripper such as is used in agriculture) or another flowrate control mechanism is optionally provided in the water-delivery flowpath to control the rate of water delivery. An additional or alternative mechanism to control flow, such as a capillary tube, can be included.

Furthermore, a heating element 470 can be included, for example positioned within the housing 420 and below the water-delivery flowpath and connected water-carrying components (440, 442, etc.), and operated/controlled to prevent freezing of water in the water-delivery flowpath/components. The heating element 470 can be a conventional electrical-resistance heating element (e.g., a sheet, panel, or strip), including power wiring 472 to the control system (which includes an on-off control and optionally variable heat control such as multiple discrete heating levels and/or a range of heat levels), and attached to a mounting element (e.g., the depicted plate, which can be made of aluminum or another high-conductivity material).

The invention also includes systems and methods for humidification of spaces and materials, for example for humidification and conservation of vegetables, seafood, meat, deli, floral, and agro food products. In example embodiments, one or more systems or devices as shown and described herein are operated to deliver humidity, for example in the form of a fog or mist, to such products and/or to an enclosed space for containing such products. In particular example embodiments, one or more humidification systems incorporating one or more ultrasonic nozzles, atomizers, nebulizers, aerosol generating nozzles, nanoparticle generating nozzles, vibratory nozzles, sprayers, and/or other means for generating a fog for delivering humidification are operated to deliver humidity to vegetables, seafood, meat, deli, floral and agro food products.

Various systems/subsystems, elements, assemblies, components, and/or other parts and features of one or more particular example embodiments described and/or shown herein may be combined with or utilized in place of or in addition to corresponding or associated systems/subsystems, elements, assemblies, components, and/or other parts and features of one or more other example embodiments described and/or shown herein. For example, multiple different types of the fog-generation systems described and/or shown herein can be combined into another humidification system, or one of the fog-generation systems described and/or shown herein can be combined with a conventional fog-generation system or another fog-generation system not described and/or shown herein to form yet another humidification system. In addition, while the invention has been described and shown with respect to humidification systems including a water delivery system, an air delivery system, a control system, and one or more fog-generation systems, in another aspect one of the individual fog-generation systems can be provided by itself for use with the other components of a humidification system.

While the invention has been described with reference to example embodiments, it will be understood by those skilled in the art that a variety of modifications, additions and deletions are within the scope of the invention, as defined by the following claims.

What is claimed is:

1. A humidification system, comprising:
   a water-delivery system including a water-delivery conduit;
   an air-delivery system including an air-delivery conduit;
   a control system configured to control waterflow through the water-delivery conduit and airflow through the air-delivery conduit; and
   at least one fog-generation block each including:
     a water manifold including an axial water lumen that is directly or indirectly connected to and fed by the water-delivery conduit,
     an air manifold including an axial air lumen that is directly or indirectly connected to and fed by the air-delivery conduit, wherein the water manifold and the air manifold are spaced apart in a fixed relationship with the water manifold lumen and the air manifold lumen spaced apart in a fixed relationship and in a substantially parallel arrangement,
     a plurality of spray nozzles positioned and connected between the water manifold and the air manifold, wherein the plural spray nozzles each include a water inlet that is in fluid communication with the water manifold lumen, an air inlet that is substantially axially aligned with the water inlet and that is in fluid communication with the air manifold lumen, and a sprayer positioned between and fed by the water and air inlets so that the sprayer is fed the waterflow and the airflow from opposite directions, wherein the sprayer includes an outlet that is angled relative to the aligned water and air inlets, wherein the aligned water and air inlets of each spray nozzle are rotationally mounted to the substantially parallel spaced-apart water and air manifolds so that the aligned water and air inlets define a rotational axis about which the sprayer outlet can be individually angled to adjust the direction of the fog spray without reorienting the water manifold or the air manifold, and
     a bracket that extends between the water manifold and the air manifold in their spaced apart, parallel, and fixed relationship, wherein the water manifold, the air manifold, and the one or more sprayer nozzles are mounted together into a unit defining the fog-generation block,
   wherein the control system controls the waterflow and the airflow delivered to the at least one fog-generation block so that the one or more spray nozzles emit a fog spray to provide humidification.

2. The humidification system of claim 1, wherein the water-delivery conduit is adapted to connect to a pressurized water supply and the air-delivery conduit is adapted to connect to an air compressor.

3. The humidification system of claim 1, wherein the control system includes a water supply control unit connected to the water-delivery conduit and an air compressor connected to and feeding the air-delivery conduit.

4. The humidification system of claim 1, wherein the one or more spray nozzles are ultrasonic nozzles.

5. The humidification system of claim 1, wherein the aligned water and air inlets of each of the spray nozzles are in a parallel arrangement with the aligned water and air inlets of another of the spray nozzles.

6. The humidification system of claim 1, wherein the humidification system is adapted to emit the fog spray to provide the humidification to perishable post-harvest organic products.

7. The humidification system of claim 1, wherein the sprayer outlet of each spray nozzle is positionable substantially perpendicular to the aligned water and air inlets of each spray nozzle.

8. The humidification system of claim 1, wherein the at least one fog-generation block is a plurality of fog-generation blocks, and further comprising at least one water splitter that splits the water-delivery conduit to supply water to the plurality of fog-generation blocks and at least one air splitter that splits the air-delivery conduit to supply air to the plurality of fog-generation blocks.

9. The humidification system of claim 1, wherein the bracket is mountable to a support structure.

10. A humidification system for providing humidification to perishable post-harvest organic products, the humidification system comprising:
    a water-delivery system including a water-delivery conduit;
    an air-delivery system including an air-delivery conduit;
    a control system configured to control waterflow through the water-delivery conduit and airflow through the air-delivery conduit; and
    at least one fog-generation block each including:

a water manifold including an axial water lumen that is directly or indirectly connected to and fed by the water-delivery conduit, an air manifold including an axial air lumen that is directly or indirectly connected to and fed by the air-delivery conduit, wherein the water manifold and the air manifold are spaced apart in a fixed relationship with the water manifold lumen and the air manifold lumen spaced apart in a fixed relationship and in a substantially parallel arrangement, a plurality of spray nozzles positioned and connected between the water manifold and the air manifold, wherein the plural spray nozzles each include a water inlet that is in fluid communication with the water lumen, an air inlet that is substantially axially aligned with the water inlet and that is in fluid communication with the air lumen, and a sprayer positioned between and fed by the water and air inlets so that the sprayer is fed the waterflow and the airflow from opposite directions, wherein the sprayer includes an outlet that is angled relative to the aligned water and air inlets, and a bracket that extends between the water manifold and the air manifold in their spaced apart, parallel, and fixed relationship, wherein the water manifold, the air manifold, and the one or more sprayer nozzles are mounted together into a unit defining the fog-generation block, wherein the control system controls the waterflow and the airflow delivered to the at least one fog-generation block so that the one or more spray nozzles emit a fog spray to provide the humidification to the perishable post-harvest organic products, and wherein the spray nozzles are rotationally mounted relative to the water and air manifolds so that the sprayer outlets each can be individually angled to adjust a direction of the fog spray, wherein the aligned water and air inlets of each sprayer extend substantially perpendicularly to the water and air manifold lumens, and wherein the aligned water and air inlets of each spray nozzle are rotationally mounted to the substantially parallel spaced-apart water and air manifolds so that they define a rotational axis about which the sprayer outlet can be individually angled to adjust the direction of the fog spray without reorienting the water manifold or the air manifold.

11. The humidification system of claim 10, wherein the sprayer outlet of each spray nozzle is substantially perpendicular to the aligned water and air inlets of the spray nozzle, and wherein each spray nozzle is T-shaped and formed by the aligned water and air inlets and the perpendicular sprayer outlet.

12. The humidification system of claim 10, wherein the sprayer outlet of each spray nozzle is positionable substantially perpendicular to the aligned water and air inlets of each spray nozzle.

13. The humidification system of claim 10, wherein the aligned water and air inlets of each of the spray nozzles are in a parallel arrangement with the aligned water and air inlets of another of the spray nozzles.

14. The humidification system of claim 10, wherein the bracket is mountable to a support structure.

15. A fog-generation block for providing humidification to perishable post-harvest organic products, the fog-generation block comprising:

a water manifold including an axial water lumen, an air manifold including an axial air lumen, wherein the water manifold and the air manifold are spaced apart in a fixed relationship with the water manifold lumen and the air manifold lumen spaced apart in a fixed relationship and in a substantially parallel but not axially aligned arrangement, a plurality of spray nozzles positioned and connected between the water manifold and the air manifold, wherein the plural spray nozzles each include a water inlet that is in fluid communication with the water lumen, an air inlet that is substantially axially aligned with the water inlet and that is in fluid communication with the air lumen, and a sprayer positioned between and fed by the water and air inlets so that the sprayer is fed waterflow and the airflow from opposite directions, wherein the sprayer includes an outlet that is angled relative to the aligned water and air inlets, wherein the aligned water and air inlets of each sprayer extend substantially perpendicularly to the substantially parallel spaced-apart water and air manifold lumens, and wherein the aligned water and air inlets of each spray nozzle extend linearly between the sprayer and the water and air manifolds and are rotationally mounted to the substantially parallel spaced-apart water and air manifolds so that they define a rotational axis about which the sprayer outlet can be individually angled to adjust the direction of the fog spray without reorienting the water manifold or the air manifold, and a bracket that extends between the water manifold and the air manifold in their spaced apart, parallel, and fixed relationship, wherein the water manifold, the air manifold, and the one or more sprayer nozzles are mounted together into a unit defining the fog-generation block, wherein in response to the waterflow and the airflow being delivered to the at least one fog-generation block, the one or more spray nozzles emit a fog spray to provide the humidification to the perishable post-harvest organic products.

16. The fog-generation block of claim 15, wherein the bracket is mountable to a support structure.

17. The fog-generation block of claim 15, wherein the sprayer outlet of each spray nozzle is substantially perpendicular to the aligned water and air inlets of the spray nozzle, and wherein each spray nozzle is T-shaped and formed by the aligned water and air inlets and the perpendicular sprayer outlet.

18. The fog-generation block of claim 15, wherein the sprayer outlet of each spray nozzle is positionable substantially perpendicular to the aligned water and air inlets of each spray nozzle.

19. The fog-generation block of claim 15, wherein the aligned water and air inlets of each of the spray nozzles are in a parallel arrangement with the aligned water and air inlets of another of the spray nozzles.

* * * * *